Jan. 13, 1970  E. P. GARRISON ET AL  3,489,231
LUBRICATING MUD METERING DEVICE
Filed Sept. 19, 1967

ERSKINE P. GARRISON
JOHN E. TSCHIRKY
INVENTORS.

BY
*Allan M. Lockabee*
ATTORNEY

United States Patent Office 3,489,231
Patented Jan. 13, 1970

3,489,231
LUBRICATING MUD METERING DEVICE
Erskine P. Garrison, Long Beach, and John E. Tschirky, Manhattan Beach, Calif., assignors to Smith Industries International, Inc., Whittier, Calif., a corporation of California
Filed Sept. 19, 1967, Ser. No. 668,883
Int. Cl. E21c *13/04*
U.S. Cl. 175—323         5 Claims

ABSTRACT OF THE DISCLOSURE

A Moineau type pump is utilized in conjunction with the drill bit drive shaft of a well-drilling tool to deliver metered quantities of drilling mud to conventional radial and thrust bearings on the drive shaft. The helical rotor of the Moineau pump terminates concentric to the axis of rotation and rotates in a flexible stator which describes an orbit radially of the axis of rotation.

The invention includes a drill bit drive shaft having upper and lower portions concentric to the axis of rotation with the helical rotor between and integral with said upper and lower sections.

DISCLOSURE

This invention relates to a metering device for pumping metered quantities of drilling mud to the radial and thrust bearings customarily used in conjunction with drilling bit drive shafts located in the lower section of a drill string pipe.

Radial bearings in the form of metal sleeves lined with rubber or plastic surround cylindrical portions of a drill bit shaft. These radial bearings are provided with longitudinal grooves internally to conduct drilling mud from the upper end of the bearing downward to thrust bearings located therebelow. Because of the viscosity of the drilling mud, there is a considerable frictional resistance to its flow downwardly in the grooves in the radial bearings. This resistance may be so great that in normal installations, the lubricating and cooling mud will not flow through the radial bearing in sufficient quantity to achieve its desired lubricating and cooling effect. Even though the mud pressure above the drive shaft may be quite considerable, the flow is directed primarily through an axial bore in the drive shaft to the drill bit, with the result that without our metering device, the bearings are supplied with insufficient drilling mud lubricant.

It is an object of the invention to provide a metering device for positively forcing measured quantities and pressures of drilling mud to and through the radial and thrust bearings of a drilling tool of the type described.

Another object of the invention is to provide a metering device based upon the principle of the Moineau pump wherein the helical rotor thereof terminates at both ends concentric to the axis of rotation of the drill bit drive shaft so that the metering device can be actually incorporated as a portion of the length of the drive shaft without interfering with the desired true radial rotation of the drive shaft.

Another object of the invention is to provide a metering device as a component of a drill bit drive shaft wherein its outlet is below the drilling mud inlet communicating with the axial bore of the drive shaft so that the mud pumped through the metering device is not materially affected by the specific pressure of the drilling mud thereabove. The above and other objects will appear more fully from the following description in connection with the accompanying drawing.

Figure 1:
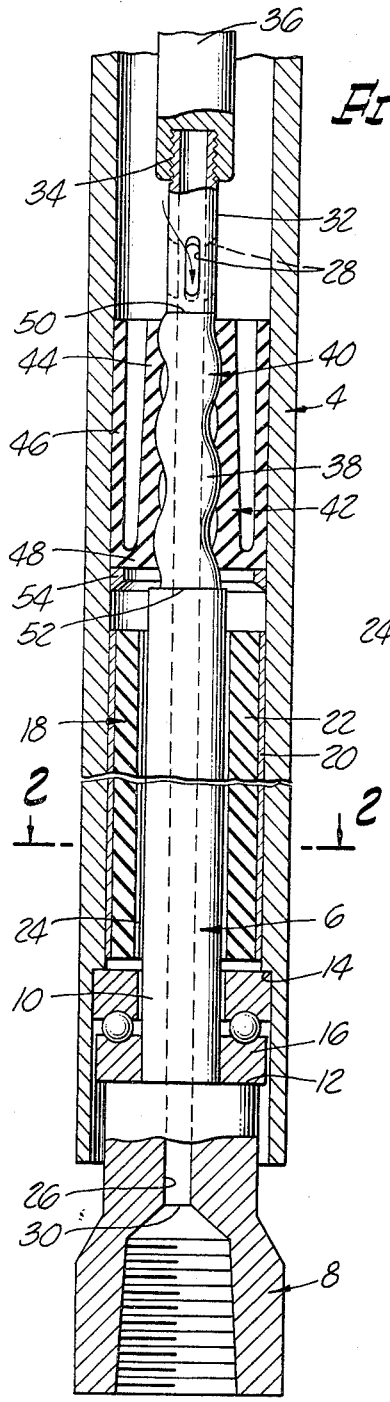
FIG. 1 is a longitudinal vertical sectional view through the lower section of a drill string pipe with an embodiment of the invention therein.
Figure 2:
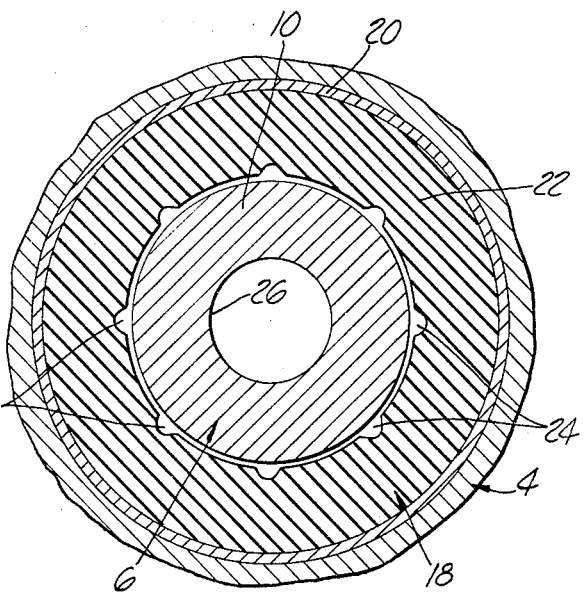
FIG. 2 is an enlarged cross-sectional view taken approximately on the line 2—2 of FIG. 1.

There is shown a drill pipe section 4 which is the lower section of a string of drill pipe extending downwardly from the conventional drilling rig at the surface. In the drill pipe section 4 is a drill bit drive shaft 6 having a drill bit sub 8 on its lower end. The drive shaft 6 has a reduced cylindrical portion 10 defining a shoulder 12. On the shoulder and between it and an internal shoulder 14 in the bottom portion of the drill pipe section 4 is a thrust bearing 16 of any suitable type.

Above the thrust bearing 16 is a radial bearing 18 which may comprise an outer metal sleeve 20 and an inner sleeve 22 of rubber or other suitable material. The sleeve 22 is provided with longitudinal grooves 24 to permit drilling mud to flow downwardly through said rubber sleeve to lubricate the radial bearing 18 and also provide lubricant and cooling for the thrust bearing 16.

The drill bit drive shaft 6 has a longitudinal bore 26 with inlet openings 28 in its upper end and a lower outlet opening 30. The upper end of the drive shaft 6 comprises a cylindrical portion 32 in which the inlets 28 are formed and the upper end thereof is threaded as at 34 for connection with a suitable rotor or flexible coupling drive member 36 for rotating the drive shaft and a drill bit or cutter adapted to be secured to the bit sub 8. The rotor drive member 36 may be connected by suitable means known in the art to a device such as a Moineau pump which in turn is driven by drilling mud forced downwardly through the drill stem by means of a mud pump located on the surface.

The drill bit drive shaft 6 is provided with an intermediate section 38 between the upper cylindrical section 32 and the lower cylindrical section 10. Said intermediate section 38 comprises the rotor of a metering device generally indicated at 40 which has the general characteristics of a Moineau pump. The intermediate section or rotor 38 is helical in shape, while in cross section it is round. The rotor turns in a stator 42 comprising an inner sleeve 44 and an outer sleeve 46 connected at their lower ends by a web 48. The inner sleeve 44 of the stator defines a longitudinal bore whose internal conformation includes helical lands and valleys, the pitch of which is preferably the same or a multiple as that of the helical rotor 38.

The metering device 40 differs from a conventional Moineau pump in that the upper end 50 and lower end 52 of the helical rotor 38 are concentric to the rotational axis of the drill bit drive shaft 6 whereas in the ordinary Moineau pump, the ends of the rotor are eccentric to the axis of rotation. This permits the helical rotor 38 to be formed as an intermediate portion of the drive shaft 6 without affecting the true radial rotation of the lower drive shaft section 10 and the upper drive shaft section 32.

Because of the helical conformation of the rotor 38, the inner sleeve 44 of the stator 42 can yield laterally and describe a radial orbit about the longitudinal axis of rotation of the drive shaft 6.

In order to maintain the flexible stator 42 in position in the drill pipe section 4, an abutment ring 54 is located in the drill pipe section 4 and may be retained therein by any suitable anchoring means.

It should be noted that the metering device 40 is located below the inlets 28 which provide flow of drilling mud downwardly through the drill string and the longitudinal bore 26 in the drive shaft 6 to provide lubricating and cooling means for the drill bit or cutter.

In previous drilling tools utilizing thrust and radial bearings such as the thrust bearing 16 and the radial bearing 18, the provision of an adequate flow of drilling mud downwardly through the radial bearing 22 and thrust bearing 16 could not assured. The resistance to flow through the grooves 24 in the radial bearing 18 placed a limitation on the length of the radial bearing since, with the increased length of bearing, the grooves 24 were likewise increased in length, and flow of drilling mud downwardly from the bottom of the radial bearing became reduced because of the fact that much of the pressure flow by-passed through the inlets 28 and downwardly through the longitudinal bore 26 into the drive shaft 6.

By providing a metering device between the drilling mud inlets 28 and the radial and thrust bearings 18 and 16, a completely satisfactory supply of drilling mud is caused to flow down through the radial bearing and through the thrust bearing in the tool. The metering device permits the use of radial bearings such as the bearing 18 of increased length, and it also permits the mud conducting grooves 24 in the bearing to be of minimum cross section so that the bearing surface of the radial bearing relative to the surface of the drill bit drive shaft therein is maintained at a maximum.

So long as there is a flow of drilling mud downwardly through the drill string of which the drill pipe 4 is a section, the metering device 40 will maintain a substantially constant and dependable pressurized flow of drilling mud to the bearings. It should, of course, be understood that various changes can be made in the forms, details, arrangement and proportions of the various parts without departing from the spirit of the invention.

We claim:

1. A drilling mud metering device for delivering measured quantities of drilling mud from a drill string to a bearing assembly wherein the improvement comprises: a radial orbit stator of flexible material having a longitudinal axis and an axial bore with internal helical valley and land conformation, a cross-sectionally round helical rotor in said bore having a pitch corresponding to that of the conformation of the bore, said rotor having upper and lower ends projecting from the ends of said stator, the projecting ends of said rotor terminating concentric to said longitudinal axis, and a radial sleeve bearing about said lower projecting end in mud flow restricting relation thereto.

2. Drilling mud metering apparatus for use in a downhole drill pipe section having a drive shaft rotatable therein with a bit sub on its lower end, a thrust bearing in said drill pipe section in downward thrust transmitting relationship between lower portions of said drill pipe section and said drive shaft, and a sleeve-like radial bearing in said drill pipe section wherein the improvement comprises: said drive shaft having lower, intermediate and upper portions, and having a longitudinal axis of rotation, the lower portion being concentric to said axis of rotation and extending through said thrust and radial bearings, the upper portion being concentric to said axis of rotation and including means for coupling with a downhole drilling mud-operated motor, a radial orbit stator of flexible material having a longitudinal axis coincident with that of said drive shaft and having an axial bore with internal helical valley and land conformation, the intermediate portion of said drive shaft comprising a helical rotor lying in the bore in said stator, whereby rotation of said drive shaft and its helical rotor will pump drilling mud through said stator in a metered pressurized supply to and through said radial and thrust bearings.

3. The structure in claim 2 and said drive shaft having a longitudinal bore with an upper inlet and a lower outlet, and said rotor and stator being located between said inlet and outlet.

4. The structure in claim 2, and said radial bearing having flow restricting clearance with respect to said lower portion of said drive shaft.

5. Drilling mud metering apparatus for use in a downhole drill pipe section having a drill bit drive shaft rotatable therein and thrust bearing means between said drill pipe section and said drive shaft, the drive shaft having a longitudinal bore with an upper inlet and a lower outlet for conducting drill mud therethrough, wherein the improvement comprises: a drilling mud flow restricting device in said drill pipe section below the upper inlet of said drill bit drive shaft bore and above said thrust bearing means, and externally of said drive shaft bore.

References Cited

UNITED STATES PATENTS

| 3,249,054 | 5/1966 | Hill | 103—117 X |
| 3,340,814 | 9/1967 | Streicher | 103—117 |

FOREIGN PATENTS

| 368,957 | 3/1932 | Great Britain. |

ERNEST R. PURSER, Primary Examiner

U.S. Cl. X.R.

103—117; 184—31